(12) United States Patent
Motoyama et al.

(10) Patent No.: US 6,476,793 B1
(45) Date of Patent: *Nov. 5, 2002

(54) USER INTERACTIVE COPY PROCESSING FOR SELECTIVE COLOR CONVERSION OR ADJUSTMENT WITHOUT GRADATION LOSS, AND ADJACENT NON-SELECTED-COLOR AREAS ARE NOT AFFECTED

(75) Inventors: Eiichi Motoyama, Tokyo; Shigeo Yamagata, Yokohama; Fumio Mikami, Chigasaki; Koji Arai, Kawaguchi; Kenji Hara, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/647,726

(22) Filed: May 15, 1996

(30) Foreign Application Priority Data

May 18, 1995 (JP) .............................................. 7-119843

(51) Int. Cl.$^7$ .............................. G09G 5/02; G06K 9/00; G03F 3/08; H04N 9/64

(52) U.S. Cl. ........................ 345/149; 382/162; 358/518; 348/577

(58) Field of Search ................................. 345/600, 601, 345/593, 594; 348/32, 34, 453, 576, 577, 538, 649, 650, 651, 652; 358/518, 1.9, 519, 520, 521, 523; 382/162, 164, 167

(56) References Cited

U.S. PATENT DOCUMENTS

| | | | | |
|---|---|---|---|---|
| 4,710,800 A | * | 12/1987 | Fearing et al. | 348/577 |
| 4,857,994 A | * | 8/1989 | Belmares-Sarabia et al. | 348/577 |
| 4,873,570 A | * | 10/1989 | Susuki et al. | 358/515 |
| 4,959,712 A | * | 9/1990 | Tsuzuki et al. | 358/518 |
| 4,979,129 A | * | 12/1990 | Okubo et al. | 345/600 |

(List continued on next page.)

*Primary Examiner*—Steven Saras
*Assistant Examiner*—Paul A. Bell
(74) *Attorney, Agent, or Firm*—Fitzpatrick, Cella, Harper & Scinto

(57) ABSTRACT

A more-natural-looking video is reproduced and a video data having a desired color tone is formed by preserving the tone of a video as an original in color conversion at a desired ratio. To this end, a criterion color register stores color information (hue, chroma and density) for determining whether input pixel data is eligible for conversion, a target color register stores color information indicative of a target color, and a preservation degree register stores a preservation degree that determines the degree of preservation in color conversion. A color determination section determines whether the input pixel data is eligible for conversion, and the determination result is output to a color converter section. The color converter section performs color conversion to eligible pixel data according to the information stored in the criterion color register, target color register and preservation degree register, with the result of the color conversion being output.

14 Claims, 8 Drawing Sheets

U.S. PATENT DOCUMENTS

| | | | |
|---|---|---|---|
| 5,105,266 A | * | 4/1992 | Telle .......................... 358/518 |
| 5,202,935 A | * | 4/1993 | Kanamori et al. .......... 382/162 |
| 5,289,295 A | * | 2/1994 | Yumiba et al. ............. 358/518 |
| 5,296,920 A | * | 3/1994 | Sakane et al. .............. 358/519 |
| 5,317,678 A | * | 5/1994 | Okawara et al. ............ 345/593 |
| 5,333,070 A | * | 7/1994 | Ichikawa .................... 358/518 |
| 5,333,243 A | * | 7/1994 | Best et al. ................... 358/1.9 |
| 5,434,683 A | * | 7/1995 | Sekline et al. .............. 358/518 |
| 5,459,824 A | * | 10/1995 | Kashiwazaki ............... 345/199 |
| 5,473,738 A | * | 12/1995 | Hamlin et al. .............. 345/593 |
| 5,486,893 A | * | 1/1996 | Takagi ........................ 396/147 |
| 5,515,172 A | * | 5/1996 | Shiau ......................... 358/518 |
| 5,548,663 A | * | 8/1996 | Sekine et al. ............... 382/164 |
| 5,627,950 A | * | 5/1997 | Stokes ........................ 345/601 |
| 5,638,496 A | * | 6/1997 | Sato ............................ 358/1.9 |
| 5,659,406 A | * | 8/1997 | Imao et al. .................. 358/518 |
| 5,668,890 A | * | 9/1997 | Winkelman ................. 382/167 |
| 5,677,741 A | * | 10/1997 | Yui ............................. 348/649 |
| 5,696,839 A | * | 12/1997 | Siegeritz ..................... 382/162 |
| 5,774,112 A | * | 6/1998 | Kasson ....................... 345/593 |
| 5,798,943 A | * | 8/1998 | Cook et al. ................. 382/162 |
| 5,819,018 A | * | 10/1998 | Sugiyama ................... 345/604 |
| 5,828,470 A | * | 10/1998 | Maeda et al. ............... 358/553 |
| 5,835,244 A | * | 11/1998 | Bestmann ................... 358/518 |
| 5,930,009 A | * | 7/1999 | Sato et al. ................... 358/518 |
| 6,101,271 A | * | 8/2000 | Yamashita et al. .......... 382/167 |
| 6,198,840 B1 | * | 3/2001 | Mitsuhashi et al. ......... 382/162 |

* cited by examiner

DEGREE OF PRESERVATION 0%
COLOR OF ORIGINAL=CRITERION COLOR

DEGREE OF PRESERVATION 0%
COLOR OF ORIGINAL WITHIN RANGE OF CRITERION

USER INTERACTIVE COPY PROCESSING FOR SELECTIVE COLOR CONVERSION OR ADJUSTMENT WITHOUT GRADATION LOSS, AND ADJACENT NON-SELECTED-COLOR AREAS ARE NOT AFFECTED

BACKGROUND OF THE INVENTION

1. Field of the Invention

The present invention relates to a video processing method for color conversion and color adjustment and to a video processing apparatus.

2. Description of the Related Art

Prior art video processing apparatuses such as copying machines perform color conversion in the following sequence.

1) A color to be converted (criterion color) and a color after color conversion are specified.

2) The video data of an original is read and then compared with the color to be converted.

3) When the comparison reveals that the video data agrees with the color to be converted, the video data of the original that is determined as the color to be converted is then converted to the specified color after color conversion.

On the other hand, a color adjustment process may be performed. For example, to stress red a bit more, hue, value and saturation or chroma of an original are accordingly varied.

In the prior art, however, when part of a video is changed, for example, to make reddish the skin color of a person in a photograph or to make bluish the color of clothes, color conversion, if performed, causes gradation such as density and shade of the skin and the clothes to be lost. Furthermore, since color conversion normally affects the entire video, colors other than those of the skin and the clothes are also adjusted (converted).

Specifying a particular area to be subjected to color adjustment allows only that area to be color adjusted. In this case, however, to specify an area, extra means such as a free line is required, and such an action to specify a particular area is not very useful for users.

SUMMARY OF THE INVENTION

Accordingly, it is an object of the present invention to provide a video processing apparatus and a video processing method, in which a particular area of a video to be processed is selectively subjected to a color processing such as color conversion and color adjustment by a simple operation.

To achieve the above object, the video processing apparatus of the present invention includes, a first specifying unit for specifying the color to be converted on a color video, a second specifying unit for specifying the post-conversion color of the color to be converted, a third specifying unit for specifying the degree of color change from the color to be converted to the post-conversion color; and processor for converting the color to be converted to the post-conversion color according to the specified degree of color change.

It is another object of the present invention to provide a video processing apparatus and a video processing method, which simply provides an instruction for the reproduction of the video that has undergone color conversion and color adjustment.

It is yet another object of the present invention to enhance the ease of use of a color setting section that is used in the course of color conversion and color adjustment.

It is yet another object of the present invention to provide a video processing apparatus and a video processing method, which offer novel functions.

These and other objects and features of the present invention will become more apparent when the following detailed description of the invention is considered with the drawings.

DESCRIPTION OF THE PREFERRED EMBODIMENTS

Referring now the drawings, the embodiments of the present invention is discussed in detail.

Embodiment 1

Figure 7:
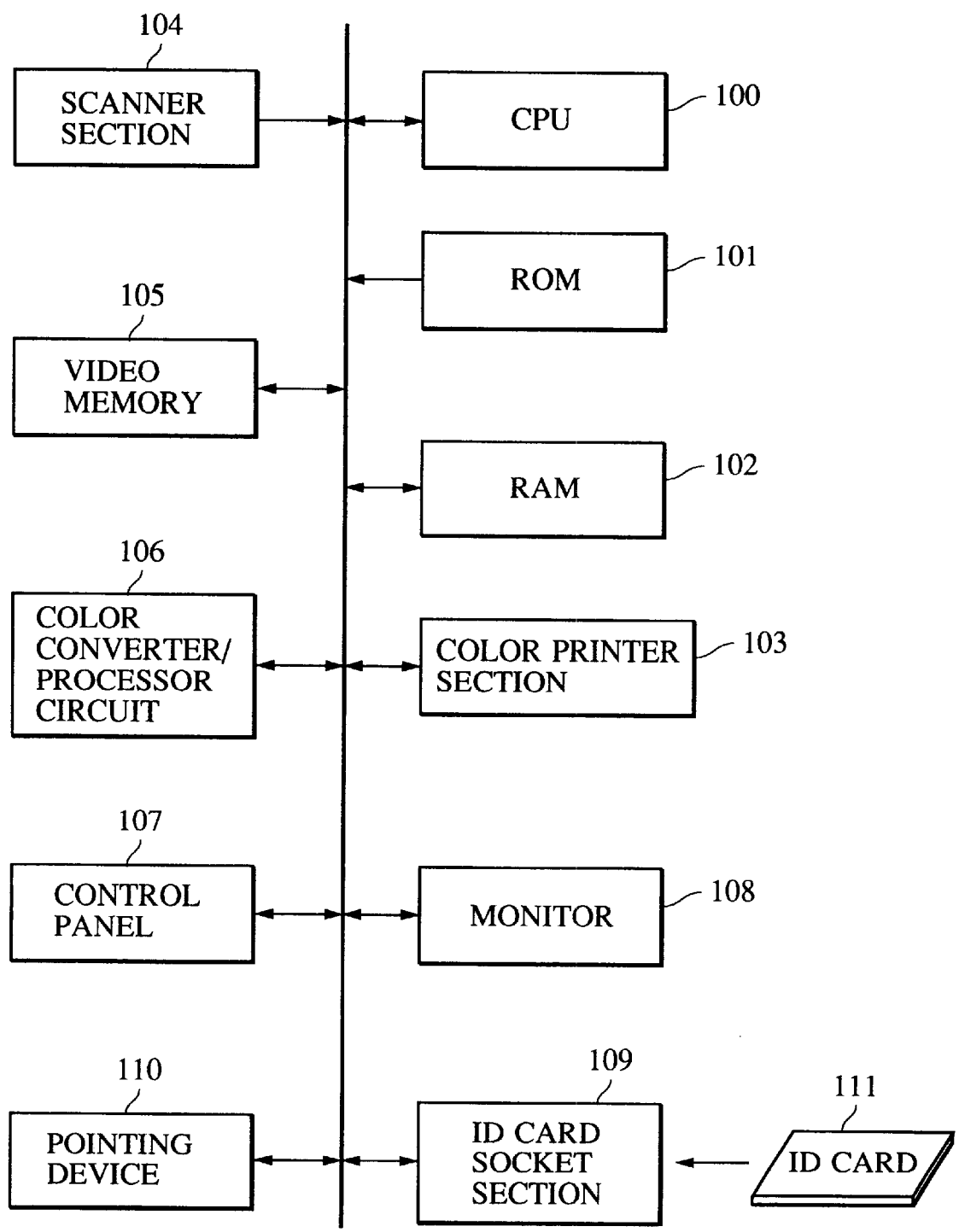
FIG. 7 is a block diagram showing a copying machine according the embodiment of the present invention.

FIG. 7 is the block diagram showing the copying machine that is an example of the video processing apparatus according to embodiment 1 of the present invention. Shown are a CPU 100 for generally controlling the apparatus, a ROM 101 for storing the operational sequence of CPU 100, and a RAM 102 that is used as the work area for CPU 100. A color printer section 103 prints a color image, and is of a type that ejects an ink drop of each of YMCK color components. A scanner section 104 reads an original video as a color image or video. A video memory 105 has a capacity of at least one page of color video. The color video data scanned by the scanner section 104 is stored in the video memory 105. Also shown are a color convertor circuit 106 (to be described in detail later) and a control panel 107 (FIG. 8) provided with switches for entering a diversity of instructions and with a display screen section for presenting messages on screen. A monitor 108 (FIGS. 10(*a*) and 10(*b*)) presents for on screen verification the processed video which will be converted by the color converter circuit 106 prior to the processed video being printed out by the color printer section 103. That is, the monitor 108 presents a preview of the processed video. Any type of monitor is acceptable as the monitor 108. For example, it may be a CRT, FLCD, TFT, or the like. An ID card socket section, 109 is adapted to receive an ID card 111, with the information on the card being read by CPU 100.

Figure 8:
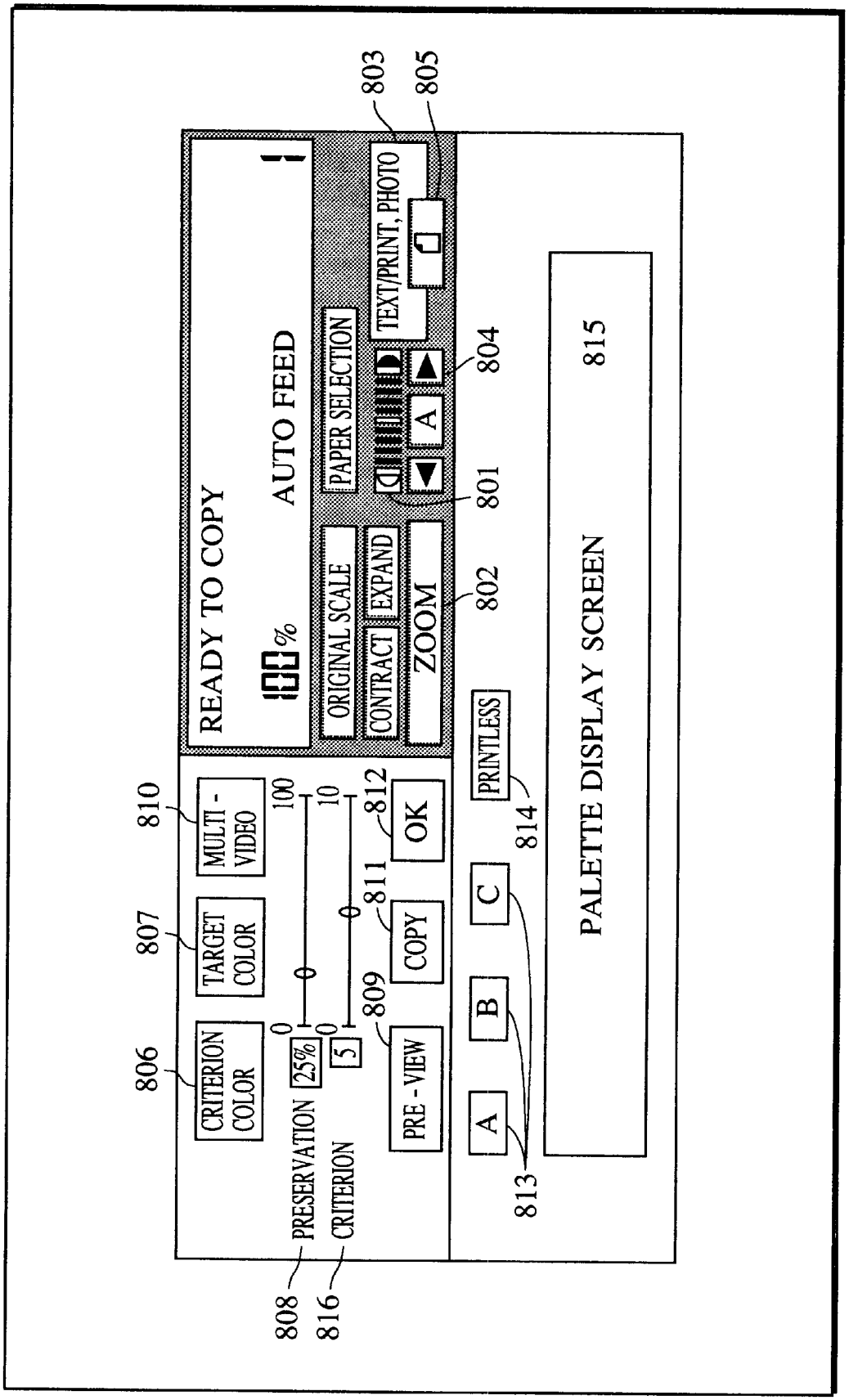
FIG. 8 is a diagram showing an example of the control panel 107 shown generally in FIG. 7.

FIG. 8 shows the example of the touchpad control panel 107 of the copying machine according to embodiment 1 of the present invention. Touchpad keys 801 are used for designating copying at a scale of natural size, reductions or enlargements. A user can thus instruct the copying machine through the touchpad keys 801 to copy an original video to a predetermined size at a desired scale, for example by 70%, 86%, 100%, 115%, 121%, 141%, and so on. A zoom control key 802 zooms the original in steps of 1%; a paper selection key 803 switches between automatic paper selection and manual paper selection. Control keys 804 adjust copying density, and pressing the key labeled A automatically adjusts the copying density to its appropriate level. Control keys 805 select the appropriate copy mode to match the type of each original, such as photographs or maps.

Control keys 806, 807 and 808 are used for specifying a criterion color, a target color and the degree of preservation, respectively, as will be described later.

Specifying the criterion color and target color is performed by indicating desired colors with the control keys 806 and 807, and ends with a color specifying step to be described later.

The degree of preservation is entered referring to a slide bar 816, and the preservation value set is presented in a recognizable manner as shown. (The degree of preservation is set to 25% in FIG. 8.) A control key 809 is a key used for requesting the so-called "preview" in which, when the color video scanned by the scanner section 104 is subjected to color conversion, the resulting color-converted video is presented for verification on the monitor 108 of FIG. 7 before it is printed.

A key 810 functions in the preview mode. A reduced video resulting from interpolated reading from the video memory 105 is color-converted according to predetermined preservation percentages 0%, 25%, 50%, 75% and 100% and, the key 810 instructs the monitor 108 of FIG. 7 to present the color converted video as multiple videos.

Figure 10A:
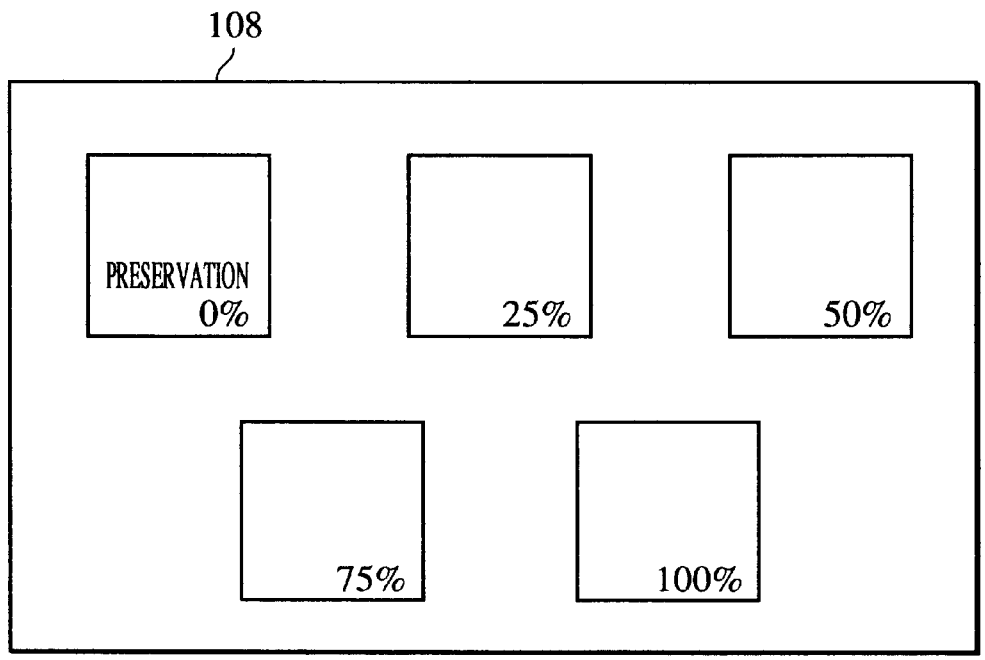
FIGS. 10(*a*) and 10(*b*) are diagrams showing examples of the monitor 108 shown generally in FIG. 7.
Figure 10B:
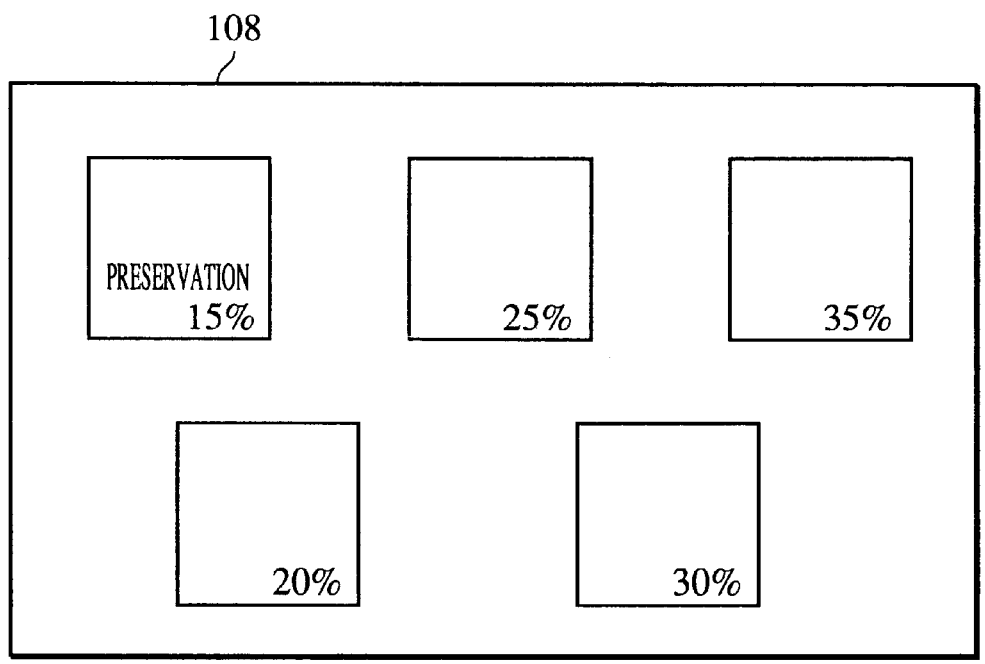

As shown in FIG. 10(*a*), each of the multiple videos is labeled with information indicating a preservation percentage that has been used in color conversion of the respective video so that the user may easily recognize it. The setting of the preservation percentages is not limited to the above manner in which predetermined preservation percentages are used. To set the preservation percentage, the slide bar 816 may be used to specify a reference preservation percentage with respect to which a predetermined range of preservation percentage, for example, ±5%, ±10%, and so on may be used, and then color-converted multiple videos may be presented on the monitor (FIG. 10(*b*)).

A key 811 is a copy key. When the user is satisfied with the resulting video in the preview, the user executes color copying by pressing the key 811.

In a multi-video mode, the user indicates the color-converted video having a desired preservation percentage from among the displayed videos in FIG. 10(*b*) using a pointing device 110 such as a mouse or a pen, and then presses an OK key 812.

According to the preservation percentage determined and set by the pointing device 110 and OK key 812, a color conversion process is performed on the scanned color video stored in the video memory 105. A reduction process is not performed on the scanned color video.

When a video having a large number of gradations is color-converted, the resulting video is again conveniently presented on the monitor 108 for verification. Then, by activating the copy key 811, video reproduction is performed.

Along with a printout reproduced video, color conversion information indicative of the criterion color, target color and preservation percentage may be printed out so that the color conversion information that has been utilized in the color conversion is recognized as a future reference.

Figure 9A:
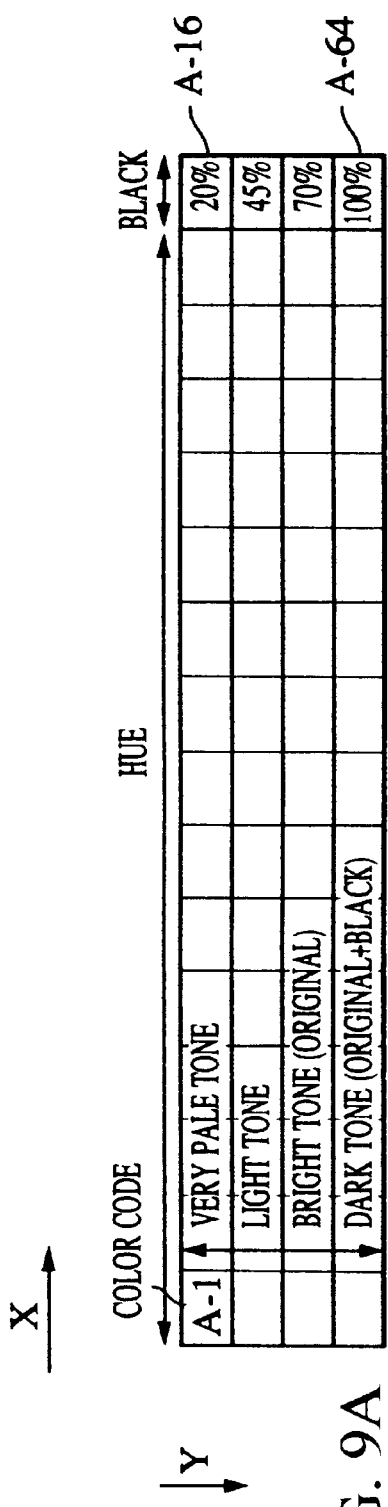
FIG. 9, consisting of FIGS. 9A, 9B and 9C, is a diagram showing an example of the color palette in the embodiment of the present invention.
Figure 9B:
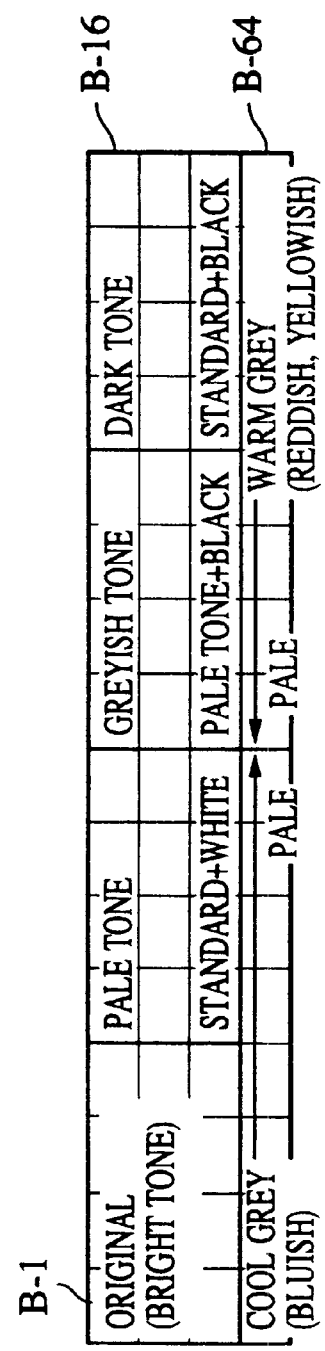
Figure 9C:
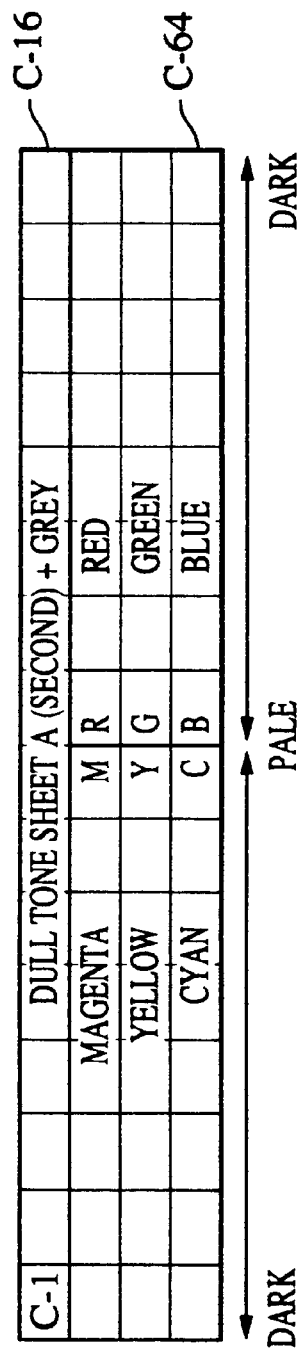

The criterion color and target color in printing may be the just specified colors, or may be entered by a type of palette and the color code in the palette (FIG. 9).

If the user does not want to print the color conversion information, he has the option not to print the color conversion information by pressing a printless key 814.

When the copy key 811 is pressed without any instruction through the pointing device 110, multiple videos currently presented on-screen on the monitor are printed.

The printout image generally has a tone different from that of what is presented on the monitor because of the coloring characteristic of the type monitor in use. Printing of the multiple videos permits easy comparison and simulates printed states.

Keys 813 are used to present color palettes for criterion and target colors. By activating keys A through C, a diversity of palettes are selectively presented on a palette display screen 815, and by using an on-screen palette, a color is specified.

The palettes in FIG. 9 are an example actual palettes shown on the palette display screen 815. The user can thus select color while visually checking it on the palette display. RAM 102 stores the color information of the palettes according to the coordinates of the palette display screen 815.

Palettes may be conveniently changed from application to application, for example, one for general users and another for designers may be selectively used. Specifically, a general user may prefer a palette of a diversity of colors while a designer may prefer a palette having a particular color tone with detailed gradations.

To meet such user needs, the embodiment of the present invention provides on an individual user basis an ID card 111 which stores a diversity of palette information (R, G, B values).

When the ID card 111 is placed in the card socket section 109, the palette information is read into RAM 102, the read palette information is processed and converted into a palette signal by CPU 100, and is then presented on the palette display screen 815. As a result, the displayed palette is ready for color specifying.

The slide bar 816 sets a range of criterion. The criterion range will be discussed later.

Figure 1:
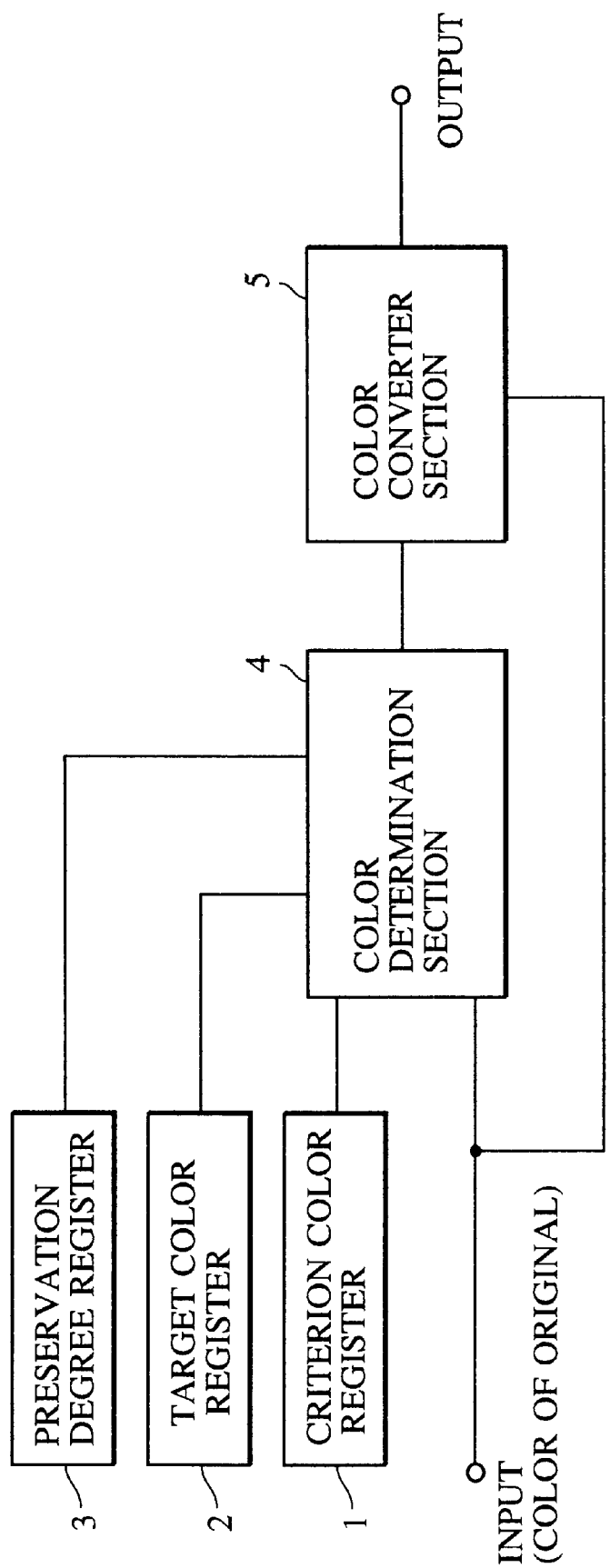
FIG. 1 is a block diagram showing a color converter circuit according to an embodiment of the present invention.

FIG. 1 is the block diagram of the major portions of the color converter circuit 106 according to the embodiment of the present invention.

A criterion color register stores the information on the color to be converted (criterion color). A target color register 2 stores the information on the after conversion color or post-conversion color (target color). A preservation degree register 3 stores the degree of preservation in color conversion. The preservation degree register 3 holds the information indicative of how much chroma or saturation and density of an original are preserved when they are converted to target colors through the color conversion process (the higher the preservation degree, the closer the result is to the chroma and density of the original video). A color determination section 4 determines whether color conversion is performed to an input video (the data of the original) based on the data stored in the criterion color register 1, and outputs determination results. Based on the determination results of the color determination section 4, a color converter section 5 performs color conversion to the input color data of the original according to the preservation degree stored in the preservation degree register 3 and the target color stored in the target color register 2.

In this embodiment, the RGB data of the input video (the output from the scanner section 104) is converted into cyan (C), magenta (M), and yellow (Y), which are then internally converted into hue, chroma and density (value) to be stored once into the video memory 105. These data are sequentially entered to be color-converted. Therefore, data stored in the preservation degree register 1 and target color register 2 are data of hue, chroma and density (value).

Figure 2:
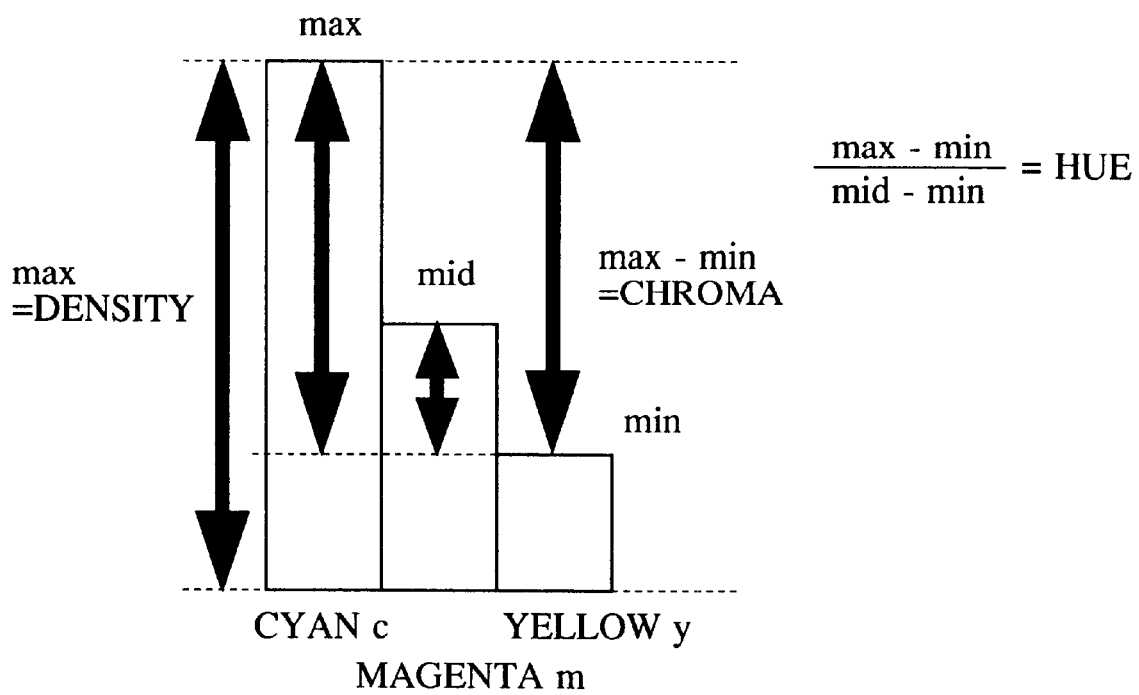
FIG. 2 is a diagram showing a color conversion in terms of hue, chroma and density in a CMY color space.

FIG. 2 shows an example of CMY data of one pixel (picture element) in input video data. As shown in FIG. 2, hue, chroma and density (value) are derived from the input video pixel data (each component data of C, M, and Y). Hue in the video data represented by three components C, M, and Y is expressed by the ratio of the components obtained by subtracting an achromatic color component from each component. Since the achromatic color component is expressed by the minimum value of the three components, hue is expressed by the ratio of two components of the maximum value and minimum value.

For example, suppose that the three components are max for the maximum value, min for the minimum value and mid for the middle value. Hue is expressed by (max-min)/(mid-min). Density is expressed by max and chroma is expressed by max-min.

In FIG. 2, the maximum value is the C component, the minimum value is the Y component, and the middle value is the M component, thus, $$Hue = (C-Y)/(M-Y)$$

$$Density = C$$

$$Chroma = C-Y$$

Conversion equations for converting YMC into hue, chroma and density are not limited to the ones above. Alternatively, other conversion equations (a determinant, for example) may be employed.

Discussed next is the color conversion process in which the video data expressed as above is color-converted by the color converter circuit shown in FIG. 1.

In the following discussion, the hue component of a color C is referred to as H[C], its chroma component is referred to as S[C], and its density component is referred to as D[C].

Figure 3:
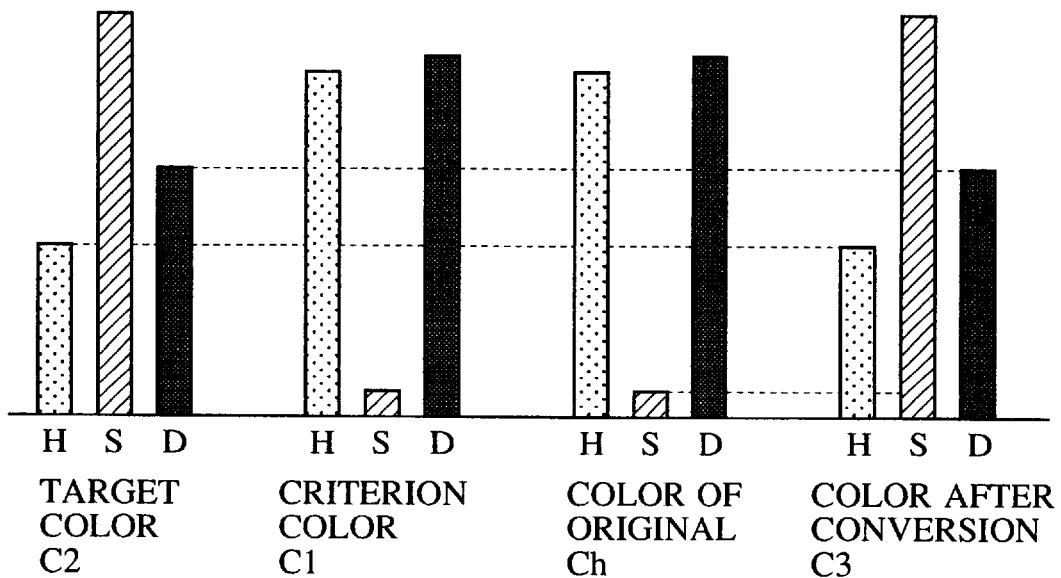
FIG. 3 is a diagram showing an example of a color conversion algorithm with a preservation degree of 0%.

In FIG. 3, a color Ch (the color of the original) is color-converted to a color C2 (the target color) at a preservation degree of 0% (namely, color conversion is performed with no consideration given to the density and chroma of the original), and FIG. 3 indicates the color conversion algorithm in which the color of the original Ch entered to the color converter circuit is identical to a criterion color C1.

The criterion color C1 and target color C2 are stored respectively in the criterion color register 1 and target color register 2, and a preservation degree of α=0% is stored in the preservation degree register 3. The color Ch of the original input is compared with the criterion color C1 by the color determination section 4. In this case, the color of the original Ch is identical to the criterion color C1, and the color determination section 4 decides to color-convert the color Ch of the original and issues to the color converter section 5 a signal indicative of that decision.

Next, the color converter section 5 performs a color conversion process to the color Ch of the original. Color substitution involved in color conversion process is computed according to the following equations.

$$H[C3] \leftarrow H[C2] \qquad \text{Equation 1-1}$$

$$S[C3] \leftarrow S[Ch] + (S[C2] - S[C1]) \times (100-\alpha)\ (\%) \qquad \text{Equation 1-2}$$

$$D[C3] \leftarrow D[Ch] + (D[C2] - D[C1]) \times (100-\alpha)\ (\%) \qquad \text{Equation 1-3}$$

Now, Ch=C1, thus, hue H[C3], chroma S[C3], and density [C3] of a color C3 after conversion are expressed as follows:

$$H[C3] = H[C2] \qquad \text{Equation 1-4}$$

$$S[C3] = S[C2] \qquad \text{Equation 1-5}$$

$$D[C3] = D[C2] \qquad \text{Equation 1-6}$$

Figure 4:
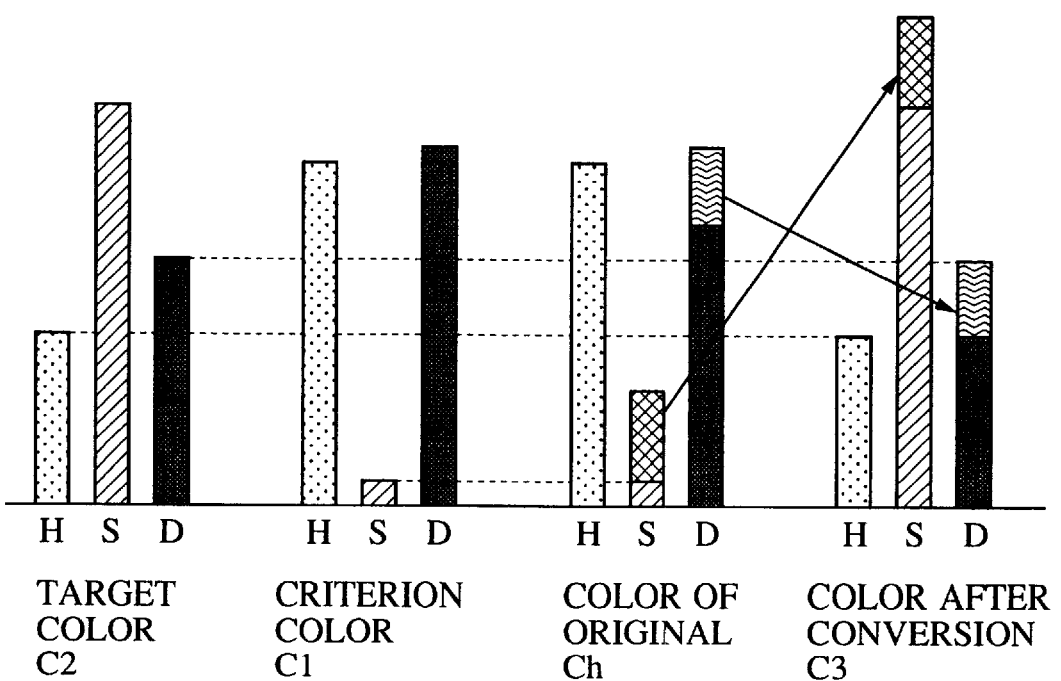
FIG. 4 is a diagram showing an example of a color conversion algorithm with a preservation degree of 0%.

FIG. 4 shows the color conversion algorithm in which the color Ch of the original is converted into the target color C2 in the color conversion process where the color Ch of the original input to the color converter circuit is not identical to the criterion color C1 but within a predetermined criterion range. For example, the criterion range may be 10% with respect to each component value of the criterion color, and the color of the original falling within the criterion range is judged as a color to be converted. The criterion range may be freely set up at the option of the user. The criterion range may be set by +A and −B format (A and B denote actual values) rather than by percentage.

The target color, criterion color and criterion range are entered through the control panel 107 as already described. Alternatively, the target color, criterion color and range may be entered as follows: a coordinates input device (such as a digitizer) is connected to the apparatus of the present invention, an original to be colored converted and an original having a target color are set, the locations of the color to be converted and the target color are pointed on the originals, the locations on the originals are read to pick up the colors at the pointed positions.

Either way color conversion is performed on the criterion color or within the predetermined range of the criterion color after the criterion color and target color are set and the criterion range is set.

Suppose that the criterion color C1 and target color C2 are stored respectively in the criterion color register 1 and target color register 2, and that a preservation degree of α=0% is stored in the preservation degree register 3. The color Ch of the original input is compared with the criterion color C1 by the color determination section 4. In this case, the color of the original Ch is in the vicinity of the criterion color C1 and falls within the criterion range, and the color determination section 4 decides to color-convert the color Ch of the original.

Color substitution in color conversion process is performed according to the above-described equations 1-1, 1-2 and 1-3.

Hue H[C3], chroma S[C3] and density D[C3] of the color C3 after conversion are expressed as follows.

$$H[C3] = H[C2] \qquad \text{Equation 1-7}$$

$$S[C3] = S[Ch] + S[C2] - S[C1] \qquad \text{Equation 1-8}$$

$$D[C3] = D[Ch] + D[C2] - D[C1] \qquad \text{Equation 1-9}$$

As for S and D, the tone of the original (variations in chroma and density) is expressed by adding to the target color C2 the difference between the criterion color C1 and the color Ch of the original.

Figure 5:
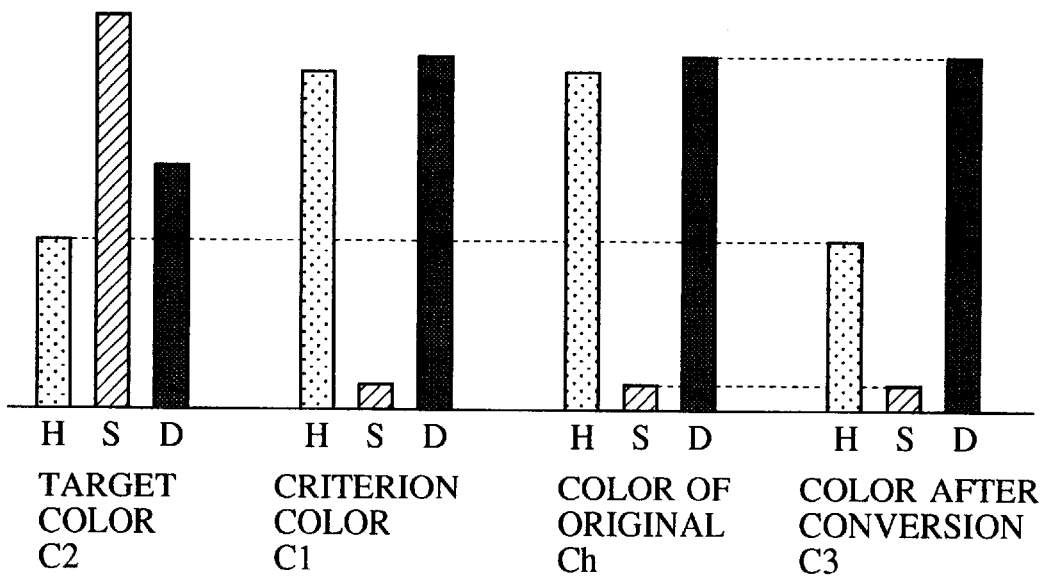
FIG. 5 is a diagram showing an example of a color conversion algorithm with a preservation degree of 100%.
Figure 6:
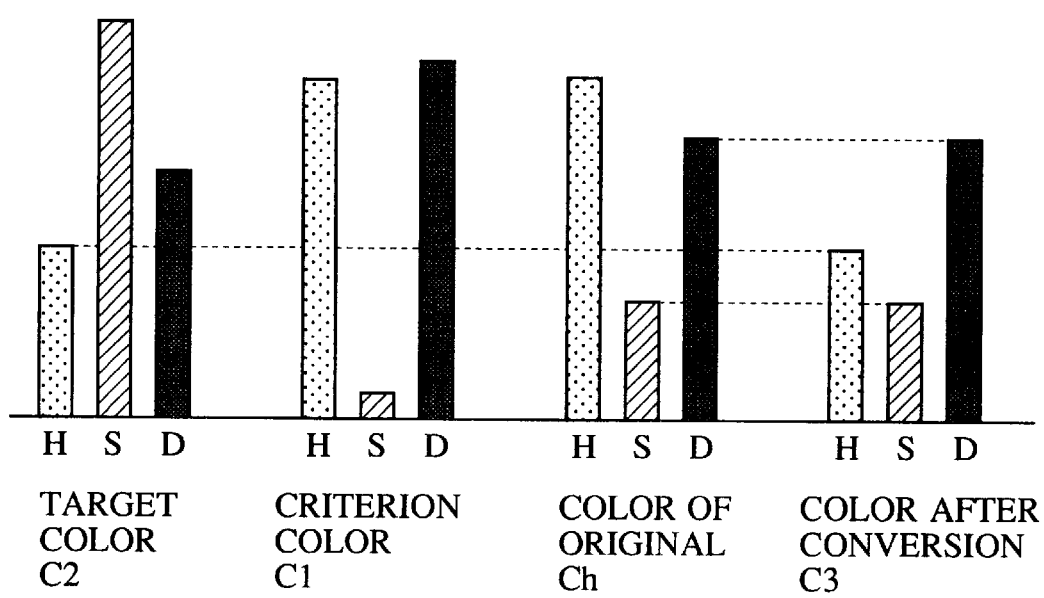
FIG. 6 is a diagram showing an example of a color conversion algorithm with a preservation degree of 100%.

Examples of color conversion with a preservation degree of 100% is discussed, referring to FIGS. 5 and 6.

First, data of points on an original representing the area of interest to be color adjusted, for example, data of the skin color of the face of a person in a photograph is picked up as the color C1 (criterion color) and C2 (target color). Alternatively, the user may specify colors from previouslydescribed color samples on the color palettes, or may specify predetermined values according to predetermined specifying method such as "bluish" or "reddish" command, or may specify colors by introducing an increase or decrease in the criterion color.

The criterion color C1 and target color C2 are stored respectively in the criterion color register 1 and target color register 2, and a preservation degree of α=100% is stored in the preservation degree register 3.

The example shown in FIG. 5 is first discussed. The color Ch of the original input is compared with the criterion color C1 by the color determination section 4. In this case, the color of the original Ch is identical to the criterion color C1, and the color determination section 4 decides to color-convert the color Ch of the original.

Next, the color converter section 5 performs color conversion process to the color Ch of the original.

Color substitution involved in color conversion process is performed according to the equations 1-1, 1-2 and 1-3.

In this case, since the preservation degree α=100%, hue H[C3], chroma S[C3], and density [C3] of a color C3 after conversion are expressed as follows:

$$H[C3]=H[C2] \qquad \text{Equation 1-10}$$

$$S[C3]=S[Ch] \qquad \text{Equation 1-11}$$

$$D[C3]=D[Ch] \qquad \text{Equation 1-12}$$

In the example in FIG. 6, the color Ch of the original falls within the criterion range of the criterion color C1, and thus hue H[C3], chroma S[C3], and density [C3] of a color C3 after conversion are expressed in the same way as in the example in FIG. 5 as follows:

$$H[C3]=H[C2] \qquad \text{Equation 1-13}$$

$$S[C3]=S[Ch] \qquad \text{Equation 1-14}$$

$$D[C3]=D[Ch] \qquad \text{Equation 1-15}$$

Namely, with a preservation degree of 100%, the chroma and density (value) of the color Ch of the original remain unchanged while its hue changes.

As described above, according to the above embodiment, the chroma and density (value) of the video as an original in color conversion are preserved at a desired ratio, not only natural video is reproduced, but also video data having a desired color tone is formed. Resulting video can thus be rendered diverse, ranging from a more natural one to a greatly varied one.

Alternate Embodiment

In the embodiment 1, determination and color conversion are performed by deriving hue, chroma and density (value) from each data of cyan C, magenta M and yellow Y. The present invention is not limited to this method.

For example, the color C3 after color conversion may be determined based on the level of each data of cyan C, magenta M and yellow Y as follows.

The maximum value max[C3] of the color component after color conversion is the density component of the color after color conversion, and thus, $$\max[C3]=\max[Ch]+\{\max(C2)-\max(C1)\}\times(100-\alpha)(\%) \qquad \text{Equation 3-1}$$

The minimum value min[C3] of the color component after color conversion is the difference between the maximum value of the color after color conversion and the chroma component after color conversion, and thus, $$\min[C3]=\max[C3]-(\max[Ch]-\min[Ch])-\{(\max[C2]-\min[C2])\times(\max[C1]\times\min[C1])\}\times(100-\alpha)(\%) \qquad \text{Equation 3-2}$$

Since the hue of the target color C2 is identical to the hue of the color C3 after color conversion, the middle value mid[C3] of the color component after color conversion is expressed as follows.

$$(\max[C2]-\mathrm{mid}[C2]):(\max[C2]-\min[C2])=(\max[C3]-\mathrm{mid}[C3]): (\max[C3]-\min[C3]) \qquad \text{Equation 3-3}$$

Thus, the middle value mid[C3] is $$\mathrm{mid}[C3]=\max[C3]-\{(\max[C2]-\mathrm{mid}[C2])*(\max[C3]-\min[C3])\}/(\max[C2]-\min[C2]) \qquad \text{Equation 3-4}$$

The maximum, middle and minimum values after color conversion are determined in this way. The color of the maximum value is the color of the maximum value in the target color C3, the color of the middle value is the color of the middle value in the target color C3 and the color of the minimum value is the color of minimum value in the target color C3.

In the above embodiments, the present invention is applied to a the copying machine. Alternatively, the present invention may be applied to a scanner for reading an original video, a printer that performs a printing process or to any other system in which a processing apparatus for color conversion is stand-alone unit. The present invention may be applied to a system made up a plurality of apparatus, or may be applied to a single-unit apparatus. The present invention may also be applied to a system or apparatus that is program-controlled.

As described above, according to the embodiments of the present invention, color conversion is performed with the tone of the original video preserved and with no loss of gradation after color conversion.

The same specifying method and determination method involved in color conversion are used to select the area to be color adjusted, and part of the original is color-adjusted without extra area setting (determining) means.

As described above, according to the above embodiment, the tone of the video as an original in color conversion is preserved at a desired ratio, not only is natural video reproduced, but also video data having a desired color tone is formed.

What is claimed is:

1. An image processing apparatus comprising:
    a first specifying unit, that specifies a color to be converted among a plurality of colors on a color image;
    a second specifying unit, that specifies a color after color conversion corresponding to the color to be converted;
    a third specifying unit, that specifies a degree of preservation in color conversion from the color to be converted to the color after color conversion;
    a fourth specifying unit, that specifies a criterion range in color conversion; and
    a processor, that processes a hue of the color to be converted to a hue of the color after color conversion, wherein at least one of chroma and brightness of the color to be converted is converted in accordance with the degree of preservation in color conversion and the criterion range, and each of said first specifying unit, said second specifying unit, said third specifying unit, and said fourth specifying unit is specified in accordance with a user's instructions.

2. The image processing apparatus according to claim 1, wherein each of said first specifying unit and said second specifying unit comprise a digitizer.

3. The image processing apparatus according to claim 1, wherein each of said first specifying unit and said second specifying unit comprise a color palette.

4. The image processing apparatus according to claim 3, wherein information on the color palette is stored in detachable memory means.

5. The image processing apparatus according to claim 1, further comprising a display unit for displaying process results by the processing means.

6. The video processing apparatus according to claim 5, wherein said display unit presents as multiple images the image that are processed at a plurality of degrees of color change.

7. An image processing method comprising the steps of:
specifying a color on a color image to be converted;
specifying a color after color conversion corresponding to the color to be converted;
specifying a degree of preservation in color conversion from the color to be converted to the color after the color conversion;
specifying a criterion range on a color image to be converted; and
converting a hue of the color to be converted to a hue of the color after color conversion,
wherein at least one of chroma and brightness of the color to be converted is converted in accordance with the degree of preservation in color conversion and the criterion range, and each of said first, second, third, and fourth specifying steps are specified in accordance with a user's instructions.

8. The image processing method according to claim 7, wherein each of said color-specifying steps are performed using a digitizer.

9. The image processing method according to claim 7, further comprising the step of presenting process results obtained in said converting step, using a display.

10. The image processing apparatus according to claim 9, wherein the display presents as multiple images the images that are processed at a plurality of degrees of color change.

11. The image processing method according to claim 7, wherein said first and second specifying steps are performed using a color palette.

12. The image processing method according to claim 11, wherein information on the color palette is stored in a detachable memory of an image processor that performs said image processing method.

13. An image processing apparatus comprising:
a first specifying unit, that specifies a color to be converted among a plurality of colors on a color image;
a second specifying unit, that specifies a color conversion corresponding to the color to be converted;
a third specifying unit, that specifies a degree of preservation in color conversion from the color to be converted to the color after color conversion;
a fourth specifying unit, that specifies a criterion range in color conversion; and
a processor, that processes a hue of the color to be converted to a hue of the color after color conversion,
wherein at least one of the chroma and the brightness of the color to be converted is converted in accordance with the degree of preservation in color conversion and the criterion range, and
wherein each of said first specifying unit and said second specifying unit comprise a color palette, and information on the color palette is stored in a detachable memory.

14. An image processing method comprising the steps of:
specifying a color on a color image to be converted;
specifying a color after color conversion corresponding to the color to be converted;
specifying a degree of preservation in color conversion from the color to be converted to the color after the color conversion;
specifying a criterion range on a color image to be converted; and
converting a hue of the color to be converted to a hue of the color after color conversion; and
presenting process results obtained in said converting step using a display, wherein the display presents as multiple images the images that are processed at a plurality of degrees of color change, and
wherein at least one of the chroma and the brightness of the color to be converted is converted in accordance with the degree of preservation in color conversion and the criterion range.

* * * * *

UNITED STATES PATENT AND TRADEMARK OFFICE
CERTIFICATE OF CORRECTION

PATENT NO. : 6,476,793 B1
DATED : November 5, 2002
INVENTOR(S) : Eiichi Motoyama et al.

It is certified that error appears in the above-identified patent and that said Letters Patent is hereby corrected as shown below:

Column 1,
Line 56, "the post-conversion color; and processor" should read -- a post-conversion color, and a processor --.

Column 2,
Line 37, "now the" should read -- now to the --; and
Line 38, "is" should read -- will be --.

Column 3,
Line 58, "stored" should read -- is stored --;

Column 4,
Line 21, "example actual" should read -- example of actual --.

Column 6,
Line 27, "colored" should read -- color --.

Column 8,
Line 22, "a the" should read -- the --.

Column 9,
Line 12, "image" should read -- images --.

Signed and Sealed this

Ninth Day of September, 2003

JAMES E. ROGAN
*Director of the United States Patent and Trademark Office*